United States Patent [19]

Voll et al.

[11] 4,249,627
[45] Feb. 10, 1981

[54] CHASSIS AND SUSPENSION ARRANGEMENT FOR MOTOR VEHICLES

[75] Inventors: Walter Voll, Odenthal; Anton Matheis, Bergisch-Gladbach, both of Fed. Rep. of Germany

[73] Assignee: Ford Motor Company, Dearborn, Mich.

[21] Appl. No.: 79,002

[22] Filed: Sep. 26, 1979

[30] Foreign Application Priority Data

Sep. 10, 1978 [DE] Fed. Rep. of Germany ....... 2843917

[51] Int. Cl.³ .............................................. B60K 17/16
[52] U.S. Cl. .................................. 180/73 D; 280/787
[58] Field of Search ............ 180/70 P, 73 TL, 73 TT, 180/73 D, 73 C, 73 R, 71; 280/786, 787

[56] References Cited

U.S. PATENT DOCUMENTS 3,167,149  1/1965  Miller et al. ........................ 180/70

FOREIGN PATENT DOCUMENTS

| | | |
|---|---|---|
| 1405967 | 2/1962 | Fed. Rep. of Germany . |
| 1908231 | 9/1969 | Fed. Rep. of Germany . |
| 1630264 | 6/1971 | Fed. Rep. of Germany . |
| 1555163 | 4/1974 | Fed. Rep. of Germany . |
| 1505545 | 4/1976 | Fed. Rep. of Germany . |
| 2824241 | 12/1979 | Fed. Rep. of Germany ........ 180/73 D |
| 1515278 | 1/1968 | France ................................. 180/73 R |
| 2322021 | 3/1977 | France . |
| 990809 | 5/1965 | United Kingdom . |

OTHER PUBLICATIONS

Antriebsstrang des Porsche 924, Sivers and Müller, Automobiltechnische Zeitschrift, 78, (1976), pp. 259-262.

Primary Examiner—John A. Pekar
Attorney, Agent, or Firm—Clifford L. Sadler

[57] ABSTRACT

A chassis and suspension arrangement for a front engine and rear driven motor vehicle which has a flexurally and torsionally stiff tubular member surrounding the driveshaft and connected rigidly at its front end to the engine and transmission unit and its rear end to a differential and pivotably mounted about a longitudinal axis to the rear axle crossmember through two longitudinally spaced elastomeric elements.

8 Claims, 4 Drawing Figures

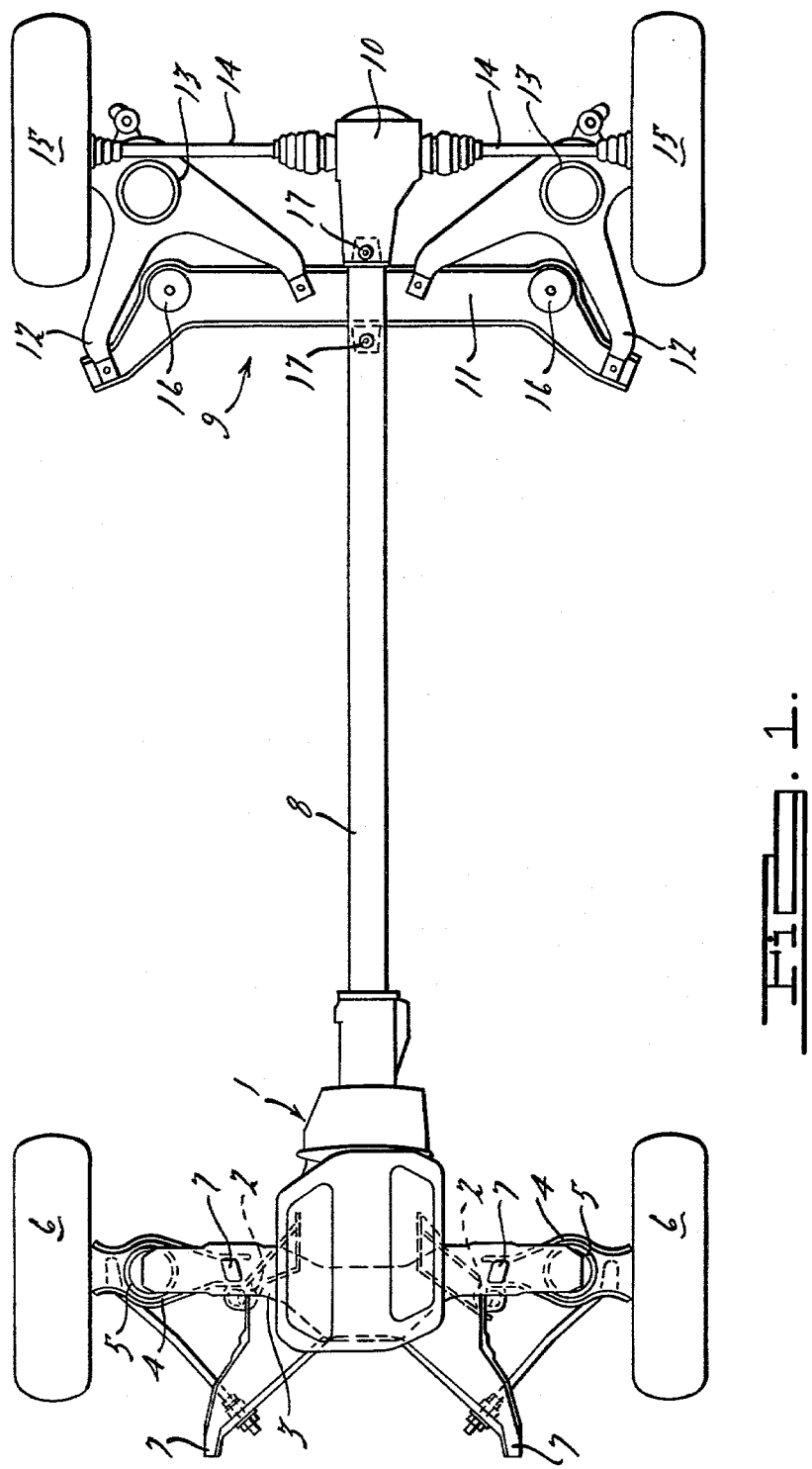

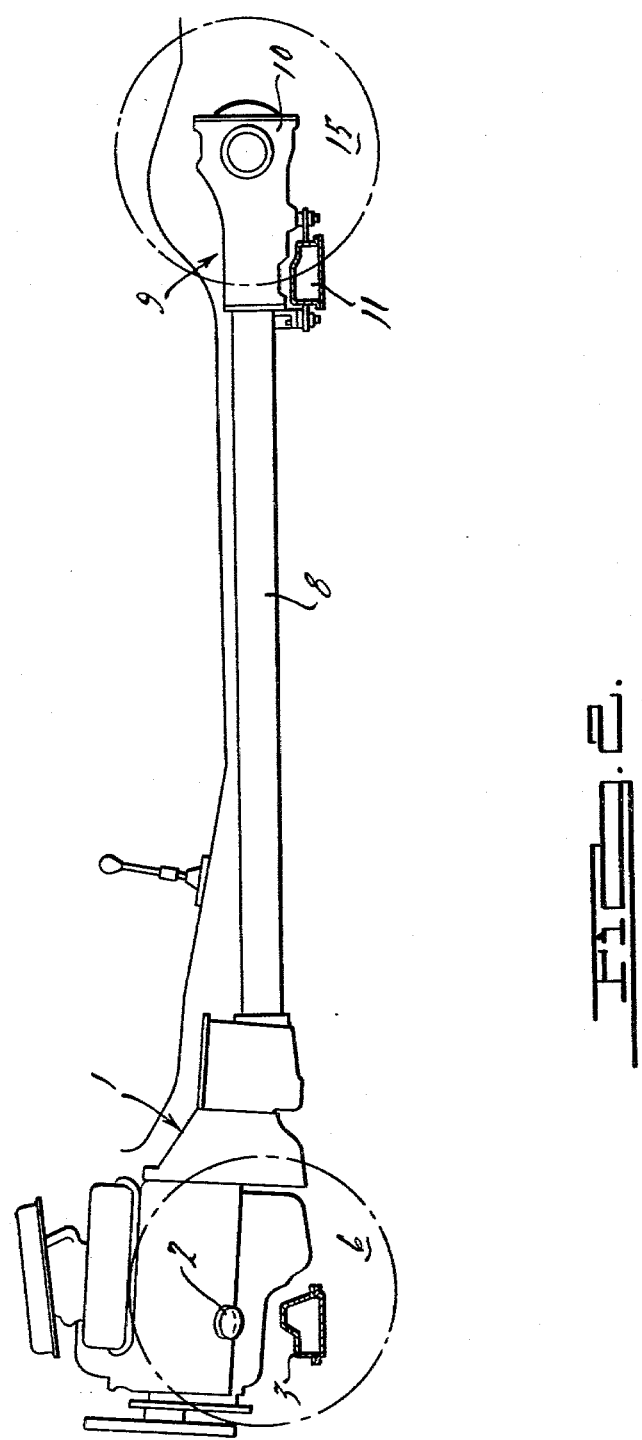

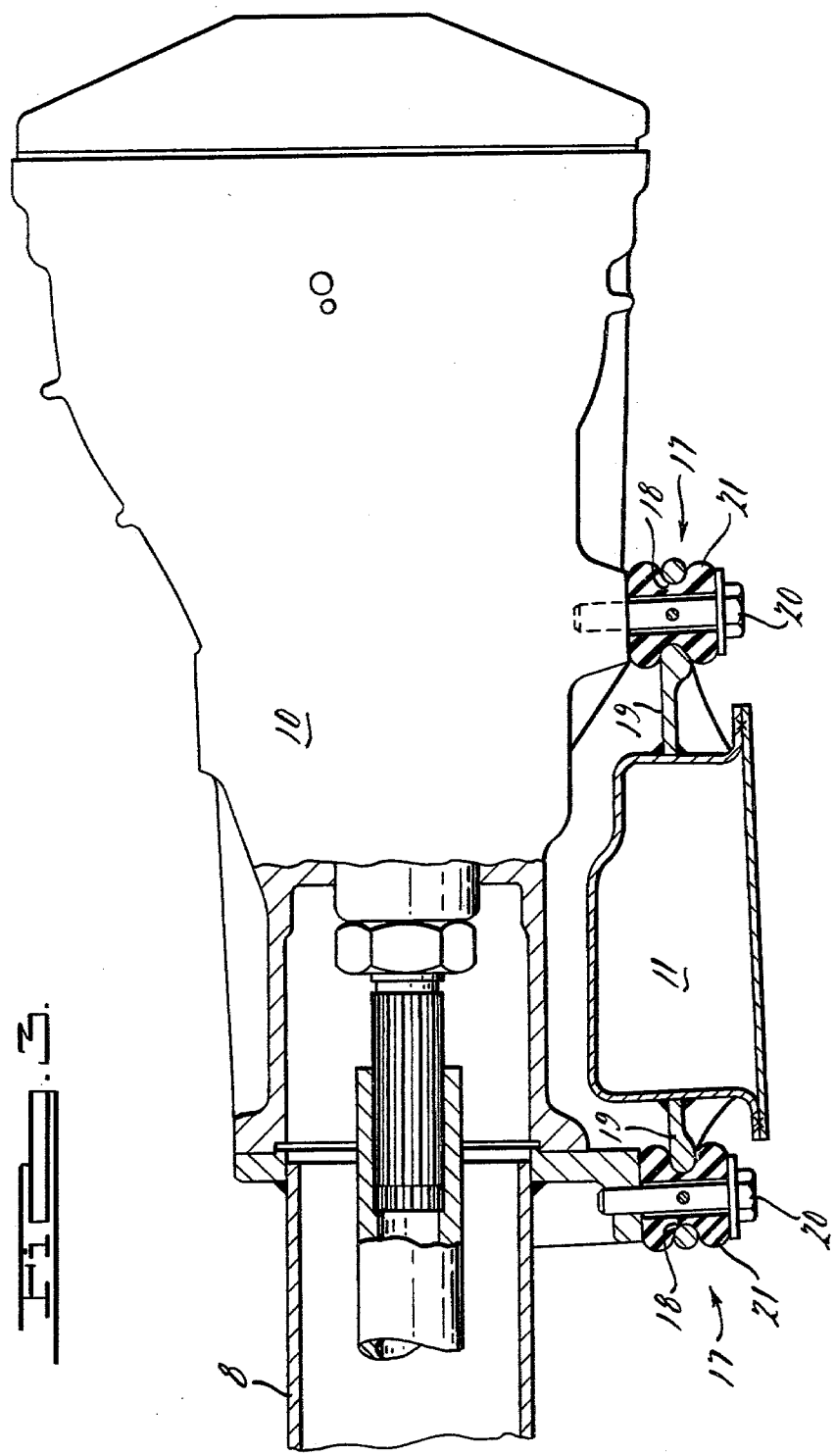

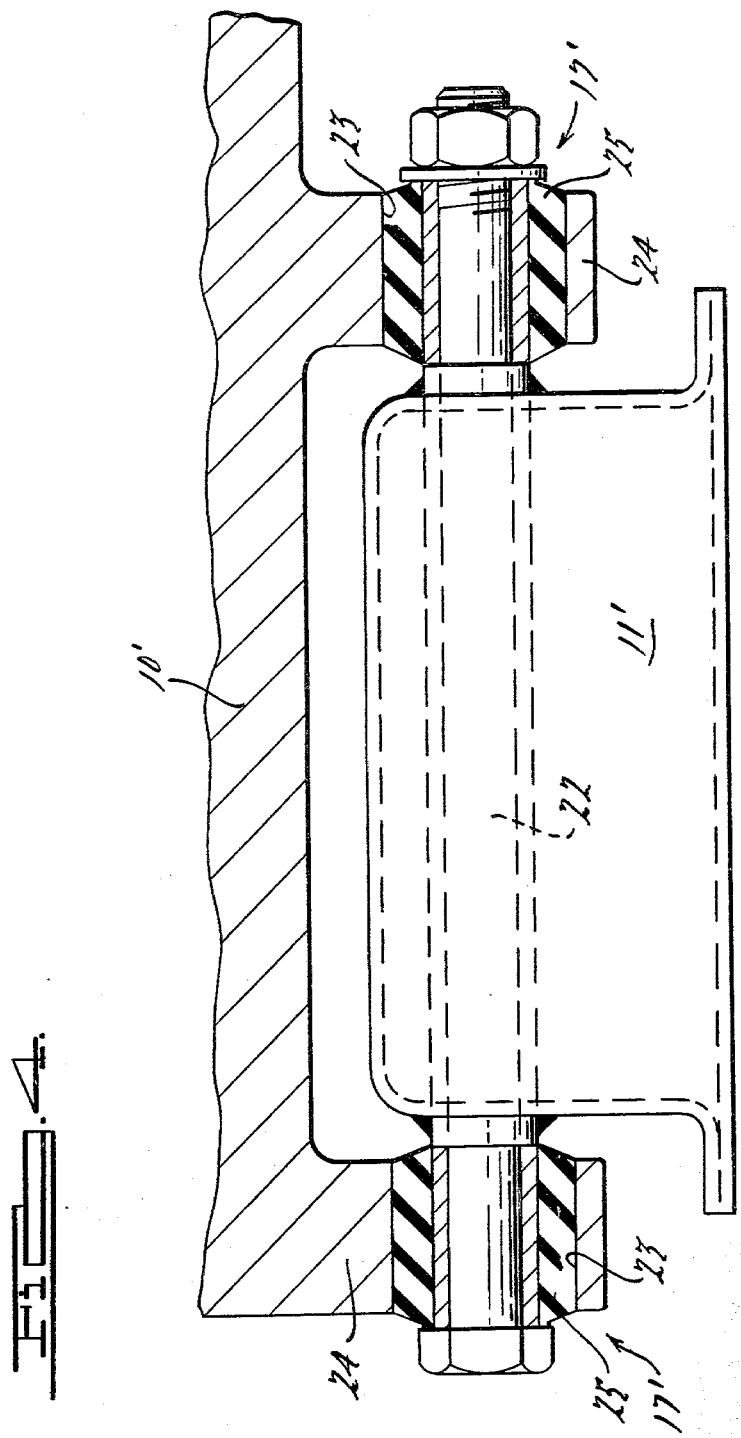

CHASSIS AND SUSPENSION ARRANGEMENT FOR MOTOR VEHICLES

BACKGROUND OF THE INVENTION

1. Field of the Invention.

This invention relates to a chassis and suspension arrangement for motor vehicles with a forward mounted engine which is firmly connected by a rigid connecting member surrounding the driveshaft to a rear differential unit.

2. Description of the Prior Art. A chassis and suspension arrangement of the type initially mentioned is described in the Swiss Motor Car Revue No. 41 of Sept. 19, 1968 on pages 3 and 19. In the described vehicle, the engine and transmission assembly is firmly connected to a rear differential and wheel suspension unit. In the known vehicle, however, the differential is secured to an upper crossmember which is secured by rubber mounts to the body while the wheel suspension arms have rubber bushings securing it to an independent lower rear axle crossmember which has widely spaced rubber isolators thereon mounting it to the body.

This known chassis and suspension arrangement exhibits the disadvantage that it is complicated in construction and assembly due to its two separate rear corssmembers. Furthermore, only the oblique control arms of the wheel suspension are "double" insulated to resist the transmission vibration to the body, once through their rubber bushings and a second time through the rubber isolators of the rear axle crossmember. Due to the direct fixing of the differential to the upper crossmember, vibrations about the longitudinal axis of the vehicle caused by the rolling forces of the engine, and gear noises of the differential are transmitted to the floor of the body with only single insulation provided by the rubber mounts mounting the crossmember to the floor.

The aim of the present invention is to improve a chassis and suspension arrangement in such a way that on the one hand the structural and assembly outlay is reduced, and on the other hand the vibration insulation of the rear mounted differential is improved.

SUMMARY OF THE INVENTION

According to the invention, a power plant is mounted in the front portion of the motor vehicle. A rear crossmember has a differential unit mounted thereon with a driveshaft operably connecting the powerplant to the differential unit. The differential unit drives two rear driving wheels. Each wheel is connected to an end of suspension arm. The other end of each suspension arm is pivotably connected to the crossmember.

A longitudinally aligned connecting member is rigidly connected at one end of the powerplant and has its opposing end rigidly connected to the differential unit. The connecting member and differential unit are mounted to the crossmember by two elastomeric elements longitudinally aligned and spaced apart for allowing limited pivotable movement of the connecting member of the differential member with respect to the crossmember.

In one preferred embodiment, the rear crossmember is secured to a body of the motor vehicle through a second set of two elastomeric elements mounted onto the crossmember approximately in the line of action between the two lateral ends of the crossmember defined by resultant forces from the suspension arms and against the connecting member through the first set of two longitudinally aligned spaced elastomeric elements.

Preferably, the elastomeric elements mounting the differentially member and connecting member to the crossmember are vertically arranged elastomeric bushings with an aperture through each. The elastomeric bushings are housed within two longitudinally aligned apertures of a bracket mounted onto the rear crossmember. Two vertically positioned bolts pass through the apertures in the bracket and bushings and mount onto the connecting member or differential unit and compress the bushings between the bracket and the differential unit or connecting member.

In another embodiment, the longitudinally aligned elastomeric elements are two horizontally arranged elastomeric bushings housed within longitudinally aligned apertures in two arms downwardly depending from the connecting member or differential unit. A bolt passes through and is secured to the rear crossmember and has opposing ends passing through each elastomeric bushing and mounted to the dependent arms through the aligned apertures.

In one embodiment, the longitudinally aligned elastomeric elements and the apertures in which the elastomeric elements are housed are longitudinally aligned with a central axis of the driveshaft. The connecting member is tubular and is coaxially mounted about the driveshaft with the longitudinal axis of the power plant and the differential units substantially aligned with the longitudinal axis of the driveshaft.

The use of a single rear crossmember provides an economical chassis suspension arrangement for mounting the differential. Simultaneously, the mounting of the connecting member and differential unit to the crossmember pivotably about a longitudinal axis substantially prevents any transfer of vibrations about the longitudinal axis caused by rolling forces of the engine to the rear axle crossmember.

Furthermore, gear noises of the differential and other vibrations are insulated firstly by the elastomeric elements used in connecting the connecting member and the differential unit to the rear axle crossmember, and a second time through the second set of elastomeric elements connecting the rear axle crossmember to the body. This double vibrational insulation permits the use of differential housing made of light alloy without their increased gear running noises being disturbingly apparent.

Because the rear axle crossmember is laterally secured to the body through two elastomeric elements arragned as close as possible to the line of action of the resultant forces from the semi-trailing control arms and against the connecting member through the elastomeric elements located at an interval, the construction and assembly outlay is further reduced by the elimination either of the double lateral bracing of the rear axle crossmember or by the elimination of the third mounting point of a rear crossmember or differential unit against the body which is normally required. The two point mounting of the rear axle crossmember to the body is possible because the elastomeric connection between the rear crossmember and the connecting member transfers the pivotable moments about a transverse axis occuring in the rear axle crossmember by drive and brake reactions to the connecting member which in turn transfers the pivotable movements to the powerplant which is secured to the front of the motor vehicle in a conventional fashion.

The chassis and suspension arrangement according to the invention achieves an advantage in weight and cost compared to the known independent bracing of rear axle crossmember and differential by the reduced construction and assembly outlay, which is supplemented by the improved vibration and noise insulation.

BRIEF DESCRIPTION OF THE DRAWINGS

The invention is explained more fully with reference to the drawings, wherein;

FIG. 1 shows a schematic plan of one embodiment of a chassis and suspension arrangement according to the invention;

FIG. 2 shows a schematic side elevation of the chassis and suspension arrangement according to FIG. 1;

FIG. 3 shows a vertical section made along the longitudinal axis of the elastic connection between the connecting member and the rear axle crossmember; and FIG. 4 shows a similar section to FIG. 3 for another embodiment of the invention.

DETAILED DESCRIPTION OF THE PREFERRED EMBODIMENTS

Referring to FIGS. 1 and 2, a known engine and transmission unit 1, often referred to as a powerplant, is mounted in a conventional manner through two elastomeric engine mounts 2 onto a front axle crossmember 3 on which the transverse control arms 4 and the coil springs 5 for the independently suspended front wheels 6 of the motor vehicle are arranged. The front axle crossmember 3 is secured to the body (not shown) by elastic elements 7 in a known manner.

The power plant unit 1 is connected to a differential and wheel suspension unit 9 through a flexurally and torsionally rigid connecting member 8.

The differential and wheel suspension unit 9 includes a differential 10 which is mounted to a rear crossmember 11. The semitrailing control arms 12 for the independently suspended rear wheels 15 sprung through coil springs 13 and driven through axle shafts 14 are pivotably connected to the rear crossmember 11 in a customary manner. The rear crossmember 11 is braced against the body (not shown) on a wide base through two elastomeric elements 16.

The flexurally and torsionally rigid connecting member 8 is constructed as a connecting tube which is connected firmly and rigidly at its front end through a flange to the engine and transmission unit and by its rear end through a flange to the differential 10. As shown in FIG. 3, the connecting tube 8 is coaxially mounted about a driveshaft 26 which operably connects the powerplant 1 to the differential 10.

The connecting member 8 is also connected to the rear axle crossmember 11 through two elastomeric connections 17 longitudinally aligned and intervally spaced such that the connecting member 8 is pivotably moveable abut a longitudinal axis with respect to the rear axle crossmember 11.

FIG. 3 shows an exemplary embodiment of this elastomeric connection in section. The elastomeric connection 17 includes two vertically arranged elastomeric bushings 21 inserted into apertures 18 in brackets 19 on the rear axle crossmember 11 and preloaded in compression by vertical bolts 20 tightened toward the connecting member 8 or the differential 10. The bracket 19 may be integrally formed with crossmember 11.

In another exemplary embodiment of this elastomeric connection shown in FIG. 4, the elastomeric connection 17' includes spaced horizontally arranged elastomeric bushings 25 receiving the ends of a bolt 22 arranged horizontally and in the longitudinal direction passing through rear crossmember 11' and housed in apertures 23 in arms 24 on the differential 10'. The arms 24 may be integrally formed with the differential 10' or modified to be integrally formed with the crossmember 8.

Due to the elastomeric connection pivotable about a longitudinal axis of the flexurally and torsionally rigid connecting member to the rear axle crossmember of the wheel suspension any transfer of the vibrations about the longitudinal axis caused by the rolling forces of the engine to the drive unit are avoided. Furthermore, a vibrational insulation of the drive unit with reference to the body is achieved. The rigid connecting member facilitates the mounting of the rear crossmember onto the body with two lateral elastomeric elements without any twisting of the same due to driving and braking moments. In this way, the third bracing point such as was previously necessary for similar drive units at the rear end of the differential can be omitted. Thus, a number of noise problems resulting from the third central bracing point placed in the center of the rear floor plate in a soft position, a position where the control of noise is difficult, can now be avoided.

A chassis and suspension arrangement according to the invention has been described in conjunction with the figures for a powerplant unit which comprises an engine, clutch and transmission unit, and for a rear differential and wheel suspension unit which comprises a rear cross member, a differential, semi-trailing control arms and wheel mounted thereto. However, it is obvious that the invention may also be applied to differently arranged sub-assemblies of the powerplant and of the differential units, e.g., in accordance with the transaxle principle or with a DeDion axle.

Variations and modifications of the present invention are possible without departing from the spirit and scope of the invention as defined in the appended claims.

The embodiments of the invention in which an exclusive property or privilege is claimed are defined as follows:

1. A chassis and suspension arrangement for a motor vehicle comprising;
   a powerplant mounted on the front portion of said morot vehicle
   a rear crossmember;
   a differential unit mounted to the rear crossmember;
   a driveshaft operably connected at one end to the powerplant and operably connected to the differential unit at an opposing end;
   two rear driving wheels operably connected to the differential;
   suspension arms operably connected at one end to a respective rear wheel and at an opposite end thereof pivotably connected to said crossmember;
   a longitudinally aligned connecting member rigidly connected to the power plant at its front end and rigidly connected to the differential at its rear end;
   said connecting member being torsionally and flexuraly rigid;
   two elastomeric elements longitudinally aligned and spaced apart pivotably mounting the connecting member and differential unit to the rear crossmember on a longitudinal axis of said motor vehicle.

2. A chassis and suspension arrangment as defined in claim 1 wherein;

said rear crossmember is secured to a body of the motor vheicle through a second set of two elastomeric elements mounted onto the crossmember approximately in the line of action extending between the two lateral ends of the crossmember caused by resultant forces from the suspension arms and against the connecting member through the said first set of two longitudinally aligned and spaced elastomeric elements.

3. A chassis and suspension arrangement as defined in claims 1 or 2 wherein;

said longitudinally aligned elastomeric elements comprise two vertically arranged elastomeric bushings;

said elastomeric bushings are positioned within two longitudinally aligned apertures in a bracket mounted onto said rear crossmember;

two vertically positioned bolts pass through said apertures and bushings and mount onto said connecting member or differential unit and preload said bushings in compression between said bracket and said differential unit or connecting member.

4. A chassis and suspension arrangement as defined in claim 3 wherein;

said vertically arranged elastomeric bushings and longitudinally aligned apertures in said bracket are longitudinally aligned with a central axis of said driveshaft.

5. A chassis and suspension arrangement as defined in claim 4 wherein;

said connecting member is tubular and is coaxially mounted about said driveshaft with said longitudinal axis of said powerplant and said differential unit substantially aligned with the longitudinal axis of said driveshaft.

6. A chassis and suspension arrangement as defined in claims 1 or 2 wherein;

said longitudinally aligned elastomeric elements comprise two horizontally arranged elastomeric bushings;

one of said connecting member or differential unit has downwardly depending arms with longitudinally aligned apertures therethrough;

said elastomeric bushings housed within said aligned apertures;

a horizontal and longitudinally aligned bolt passes through and is secured to said rear crossmember and has opposing ends passing through said elastomeric bushings and mounted to said depending arms of said connecting member or differential.

7. A chassis and suspension arrangement as defined in claim 6 wherein;

said longitudinally aligned horizontally arranged elastomeric bushings and aligned apertures in said protruding arms are longitudinally aligned with a central axis of said driveshaft.

8. A chassis and suspension arm as defined in claim 7 wherein;

said connecting member is tubular and is coaxially mounted about said driveshaft with said longitudinal axis of said powerplant and said differential unit substantially aligned with the longitudinal axis of said driveshaft.

* * * * *